June 11, 1946.   M. A. GLEESON   2,401,923
GASKET
Filed March 26, 1943
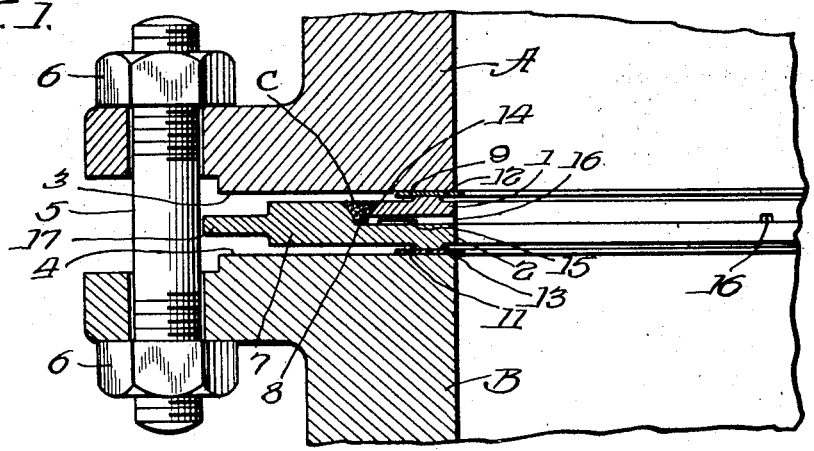
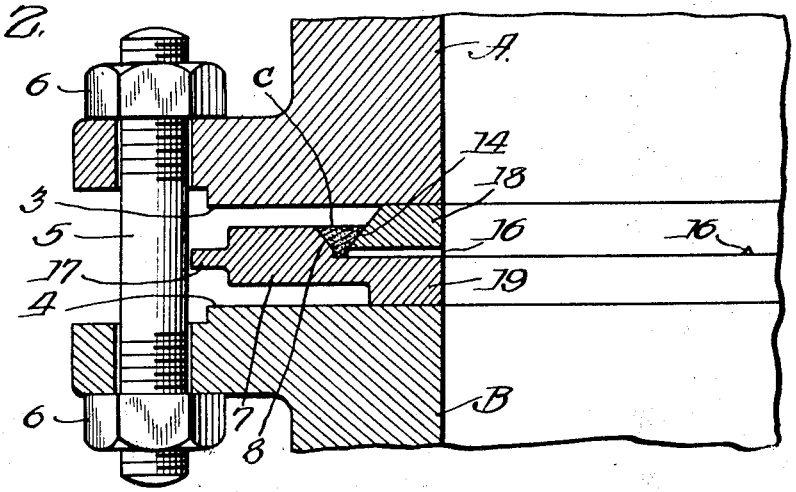
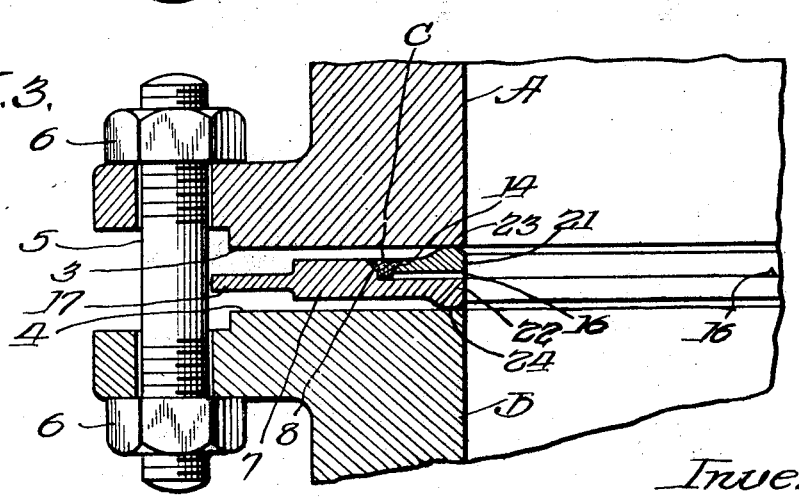
Inventor:
Murray A. Gleeson
By: Joseph O. Lange
Atty.

Patented June 11, 1946

2,401,923

UNITED STATES PATENT OFFICE 2,401,923

GASKET

Murray A. Gleeson, Chicago, Ill., assignor to Crane Co., Chicago, Ill., a corporation of Illinois Application March 26, 1943, Serial No. 480,711

3 Claims. (Cl. 288—24)

This invention relates to a novel gasket and constitutes a further improvement over the type of gasket disclosed in my copending patent application, Serial No. 471,509 filed January 6, 1943. At the outset, it is recognized that gaskets of this general type have been previously made with their outer peripheries welded so as to join the ring members together to form a pressure sealing chamber therebetween. However, actual tests have indicated that the prior types of gaskets have not been entirely acceptable because of a strong tendency to bow in the middle or intermediate portion under the usual internal pressure loads encountered. The result has been that these gaskets sacrificed a substantial part of their effectiveness due to undesirable limpness and lack of rigidity and being thus unable to apply the compression loads necessary to effect fluid tightness.

Further it has been found that with the prior gaskets above referred to, there has existed the added objection that a high internal pressure necessitates a substantial radial thickness of gasket if the hoop stresses are to be reduced to a reasonable amount. If one of the prior gaskets must be of substantial thickness, then its efficient performance is seriously impaired.

Therefore, in general, it is an important object of the present invention to provide a gasket with sufficient radial thickness to resist the hoop stresses induced by internal pressure without making the radial width of the unbalanced pressure area of the gasket so great that such unbalanced portion of the gasket will bow under pressure.

More specifically, it has been found that by providing a gasket in which the circumferential welding at the outside periphery of the gasket members is moved to a position in which such weld is located intermediate the inside and the outside diameters, as distinguished from the outer peripheral weld type previously referred to, such hoop stresses may be materially reduced.

The novel gasket constituting this invention provides for the employment of a lever arm in which the latter is sufficiently short and yet flexible enough so that the maximum proportion of the unbalanced pressure forces is available for fluid sealing at the raised inner edge, the latter location being most desirable from the standpoint of superior performance in accomplishing such sealing and joint tightness.

Other important advantages of this novel gasket will become apparent upon proceeding with the specification in light of the accompanying drawing, in which Fig. 1 shows in fragmentary section a typical installation of a preferred embodiment of my invention.

Fig. 2 similarly shows a further modification.

Fig. 3 shows another modified embodiment in partial section.

Referring now to Fig. 1, the gasket comprising the superposed plate-like members 1 and 2 of unlike diameter is shown assembled between the bolted flanges A and B, the latter members having the oppositely disposed annularly finished surfaces designated 3 and 4 respectively. These contact surface portions extend annularly almost to the bolts 5, as indicated. The flanges are provided with the usual nuts 6 for exerting the desired compression therebetween to form the flanged joint, as indicated. The lower plate-like member 2 is preferably made with a slightly greater thickness than its companion member 1, as shown at 7, so that a substantial portion of its annular width is relieved, as at 8, to receive the smaller plate-like member and to provide for the circumferential weld C joining it with the smaller plate-like member 1. Thus it will be apparent that there still remains a substantial retaining portion of the body of the plate member 2. Both of the gasket plate members 1 and 2 are preferably provided with the respective raised contact portions 9 and 11. These raised surfaces may be suitably serrated to provide for the contact with the soft metal rings 12 and 13, which may be either of copper, aluminum or lead, or of some such common materials as cement, or sealing materials known by the trade-names "Smooth-On," or "Permac" to provide the desired seal or else the rings may be of an asbestos composition, if desired.

In order to provide for a welding groove of substantially V cross-section, the inside diameter of the relieved member 1 is annularly tapered, as at 8, while the outside diameter of the member 1 is similarly tapered annularly, as at 14, thus allowing for the convenient introduction of the weld. The weld C is preferably machined or faced subsequently so as to be parallel with the upper complementary surfaces of the members 1 and 2, as indicated. In order that line pressure may be easily introduced between the members 1 and 2 and thus subsequently exert the desired compression upon the soft metal rings 12 and 13 interposed between the flanges A and B and the gasket member, a circumferential groove 15 is preferably machined in the annular member 1, and to facilitate the peripheral entry of pressure into the said groove, a plurality of radial slots 16 are provided, preferably extending radially or transversely across the member 1. It will thus become apparent from study of the foregoing assembly that by locating the annular weld at the intermediate position described, between the designated outside and inside diameters of the respective plates 1 and 2, sufficient radial thickness is provided to resist the hoop stresses normally induced by the internal line pressure. Note that this is accomplished without making the radial or transverse annular width of the unbalanced pressure area extant between the weld and the inside diameter of the gasket so great that the unbalanced portion of the gasket will bow under pressure. Further it will be apparent that the moment arm between the weld and the inside diameter of the gasket is sufficiently short and thick so that the maximum proportion of the unbalanced pressure forces is available for fluid sealing at the raised inner edges at 9 and 11 respectively.

The annular extension 17 merely functions as a centering means for the gasket in properly spacing the latter between the bolts and is preferably made integral, welded or otherwise attached.

The foregoing advantages described are also present in the modified forms shown in the remaining figures.

A modified form of gasket embodying the principle of this invention is shown in Fig. 2 in which the assembly and the manner or method of bolting is similar to that described in connection with Fig. 1. Here similarly, the weld C serves as the annular hinging means between the novel thickened annular plate-like members 18 and 19 corresponding to 1 and 2 in Fig. 1, and thus in effect serving as the annularly extending fulcrum upon which the outer dished portions of the flanges turn as the load increases to provide the desired sealing contact between the flanges A and B. Line fluid pressure enters between the thickened members by means of the radially extending slots 16 as in Fig. 1.

In the modified form of Fig. 3, the thickened portions 21 and 22 are preferably provided with rounded crests or contact surfaces as at 23 and 24 respectively. Here similarly, as described in connection with Figs. 1 and 2, the gasket consists of two plate-like members in which the smaller of the two at its outer periphery is joined by means of the weld C to the larger diameter plate 22 within the recessed portion defined by the annular limit 8. Unlike my previous contributions as above referred to, the bearing surfaces 23 and 24 as indicated are preferably provided with a relatively short lever arm so that the desirable maximum of unbalanced pressure forces is available at the raised portions or crests for the most effective contact for sealing purposes.

In summary, while others in the past have appreciated the value of an annular weld in joining two members to form a gasket, they apparently did not appreciate the more significant advantages forthcoming in providing a gasket construction of the character described so that the novel arrangement resists the excessive hoop stresses induced by internal pressure without the prior objection of making such radial width so great that there was a strong tendency for the gasket to bow under pressure.

Obviously, numerous changes may be made in the embodiments shown and described. Accordingly the spirit of the invention should be interpreted in light of the appended claims.

I claim:

1. In a pressure sealing gasket of the character described for positioning between substantially abutting flanges, the said gasket comprising a pair of substantially superposed plates having inner annular thickened portions, an annular weld intermediately positioned between oppositely disposed inside and outside peripheral surface portions of the superposed plates, one of the said latter members having a recessed portion to receive a substantial lower annular portion of the other plate, the said weld being substantially positioned within and defining the peripheral limits of the recessed portion, whereby the weld provides an annular hinge between the thickened portions of the superposed plates.

2. In a pressure sealing gasket for positioning between substantially abutting flanges, the said gasket comprising a pair of substantially superposed plates of unequal diameters having inner annular thickened portions, an annular weld intermediately positioned between oppositely disposed inside and outside diametral surface portions of the respective plates, one of the said latter members having the thickened annular portion recessed to receive a lower annular portion of the plate of smaller diameter, the said weld connecting the bottom and a continuous peripheral surface of the recessed portion with a peripheral surface portion of the plate received within the recess provided by the other plate.

3. In a pressure sealing gasket for positioning between substantially abutting flanges, the said gasket comprising a pair of plates in telescopic relation with an annular weld of substantially triangular cross-section intermediately positioned between oppositely disposed inside and outside peripheral surface portions of the telescopically assembled plates to connect thickened annular portions of the said plates, the said plates in assembled relation having an annular space therebetween communicating with line pressure whereby the gasket is expandible between limits defined by the annular weld and the inner periphery of the gasket.

MURRAY A. GLEESON.